Sept. 12, 1967 M. J. KJOS 3,341,140

TAPE TRANSPORT APPARATUS

Filed June 21, 1965

INVENTOR.
MAGNE JARLE KJOS
BY
Christie, Parker & Hale
ATTORNEYS.

United States Patent Office 3,341,140
Patented Sept. 12, 1967

3,341,140

TAPE TRANSPORT APPARATUS

Magne Jarle Kjos, Duarte, Calif., assignor to Burroughs Corporation, Detroit, Mich., a corporation of Michigan Filed June 21, 1965, Ser. No. 465,276
19 Claims. (Cl. 242—55.12)

ABSTRACT OF THE DISCLOSURE

A transport apparatus in which tape wound between two reels is directly driven by a power source and is itself utilized to transmit power to the pickup reel thereby causing rotation of the reel and the winding of tape upon the reel. The tape also transmits power to the supply reel causing rotation of this reel and the unwinding of tape from it. Power transmission from the tape to the reels is effected by a winding arrangement in which the tape belts the reels.

This invention relates to transport systems in which media are transported past an operating station and, more particularly, to transport systems utilizing an improved driving arrangement.

Transport systems include arrangements for transferring a medium such as tape or ribbon from one reel to another, the medium generally being operated upon in some manner as it passes between the reels. Thus, for example, a punch, magnetic writing or reading head, or a reader comprising a bank of photocells and a light source may be utilized to operate upon tape being transported from one reel to another. The operating station usually imposes certain requirements upon the tape motion. The station usually requires that the tape be driven past the station at constant speed or that it be driven past the station in increments of uniform length. Thus, for example, the former type motion would generally be utilized for writing information into, or reading information from, a tape, while the latter type would be utilized in a movie projector. Similarly, the ribbon of a typewriter is driven in uniform increments while the medium used in a printing operation for receiving the printed subject matter is driven either at constant speed or in uniform increments depending upon the method of printing being utilized.

Tape transportation achieved simply by the application of power to a pickup reel is unable to drive the tape past an operating station at a constant speed or in uniform increments unless a complicated drive is applied to the reel. This results since the diameter of tape wound upon the reel increases during the drive operation. Consequently, a separate drive station is usually introduced to propel the tape. A drive must still be applied to the pickup reel but its function is only to effectuate the winding of the tape upon the reel. The reel drive will usually be a constant torque drive which is just sufficient to keep the tape taut. For bidirectional operation of such a transport assembly, a similar torque drive must be applied to the source reel during the rewind operation. Thus drive power must be applied at three different locations within the assembly. Usually three separate sources of drive power are utilized, with the torque drives applied to the reels often being more expensive than the drive utilized to propel the tape past the operating station.

Another transport assembly, often called the "inside-out" arrangement, has been utilized to overcome the requirement of three separate applications of drive power. This arrangement is described for example in Knox, "Magnetic Tape Cartridges," Journal of the Audio Engineering Society, vol. 12, No. 1, pp. 32–35 (January 1964). In this arrangement, a continuous loop of tape is wound on a single reel. The loop is made continuous by winding the tape on the hub of the reel, then pulling out the center end and splicing it to the outer end. In operation, the tape is driven by a rotating capstan and pinch roller such that it is pulled from the center in a smooth continuous manner, driven past a read head and then wound upon the outside of the tape mass. This arrangement requires only one source of drive power and provides a compact and inexpensive transport assembly. It has several serious disadvantages, however. There is a constant slippage between the layers of tape wound upon the hub. This results since the linear speed of the tape is uniform throughout the tape mass wound on the hub. Such uniform linear speed requires that the rotational speed be slower at the outside than at the inside of the coil of tape. Each adjacent turn of tape, therefore, must slip in relationship to the next as the rotational speed of each turn is slightly different from the next. This slippage requires use of a special lubricated tape which is both costly and messy. Furthermore, such tape is inferior in quality to tape usable where no such slippage occurs. Another serious disadvantage of this arrangement is that it is basically unidirectional. This becomes a handicap, for example, when it is desired to back up in order to re-read a portion of the tape incorrectly read during a previous read operation.

An advantage of the present invention is that it provides a bidirectional tape transport assembly in which drive power need be applied at only a single location within the assembly.

Another advantage of the present invention is that it provides a bidirectional tape transport system in which tape may be transferred between two reels by the application of drive power at a single location within the assembly.

Yet another advantage of the present invention is that it provides a bidirectional tape transport system in which tape is transferred between two reels by the application of drive power at a single location within the assembly and in which virtually no slippage occurs between adjacent turns of tape wound upon the reels.

An additional advantage of the present invention is that it provides a compact and inexpensive assembly for transporting tape and other media.

The preceding and other advantages of the present invention are achieved by means of a novel threading arrangement whereby a tape or other medium being transferred from a supply reel to a pickup reel itself transmits the power utilized to drive the pickup reel. Subsequent references herein to "tape" shall be taken to include ribbon, material suitable for imprinting in a printing operation, and any other material unwindable from a first rotatable hub and windable upon a second rotatable hub.

In the present invention the tape itself is used as a belt for transmitting power to the pickup reel. Power is initially transmitted to the tape by means of a single power source which may, for example, drive the tape at a constant velocity or in increments of uniform length. By means of a novel winding arrangement, the tape itself is utilized as a belt to transmit power to the pickup reel thereby causing rotation of the reel and the winding of the tape upon the reel. The tape also transmits power to the supply reel causing rotation of this reel and the unwinding of tape from it. Tape tension is controlled by means of a slight braking force applied to the supply reel whereby sufficient tension is maintained within the tape. Which of the two reels between which the tape is transferred becomes the supply reel and which becomes the pickup reel is determined solely by the direction of motion imparted to the tape by the single power source.

In one embodiment of the present invention, tape unwinding from a supply reel is belted around the pickup reel, caused to pass a power transmission means which imparts longitudinal movement to the tape, then belted around the source reel, and finally wound upon the pickup reel. One or more idler wheels may be used to guide the tape between the reels and power source. An operating station past which the tape is drawn may be positioned at any point along the tape route. Whatever type of tape movement is called for by the operating station may be imparted to the tape by the power transmission means. The rotational speeds of the supply reel and pickup reel change during the course of transferring the tape from one reel to the other but at all times are just sufficient to unwind and wind the tape at rates consistent with the predetermined tape movement past the operating station. Sufficient tension within the tape to enable the belted tape itself to transmit the necessary rotational power to the pickup reel is maintained by means of a braking of the supply reel. Moreover, each of the two reels between which the tape is transferred may interchangeably be the supply reel or the pickup reel depending upon the direction of longitudinal movement imparted to the tape.

In addition the unit may be made to operate at high speeds by the addition of buffer units. Idler wheels may be utilized to effect tape loops of various sizes.

The manner of operation of the present invention and the manner in which it achieves the above and other advantages may be more clearly understood by reference to the following detailed description when considered with the drawing, in which.

Figure 1:
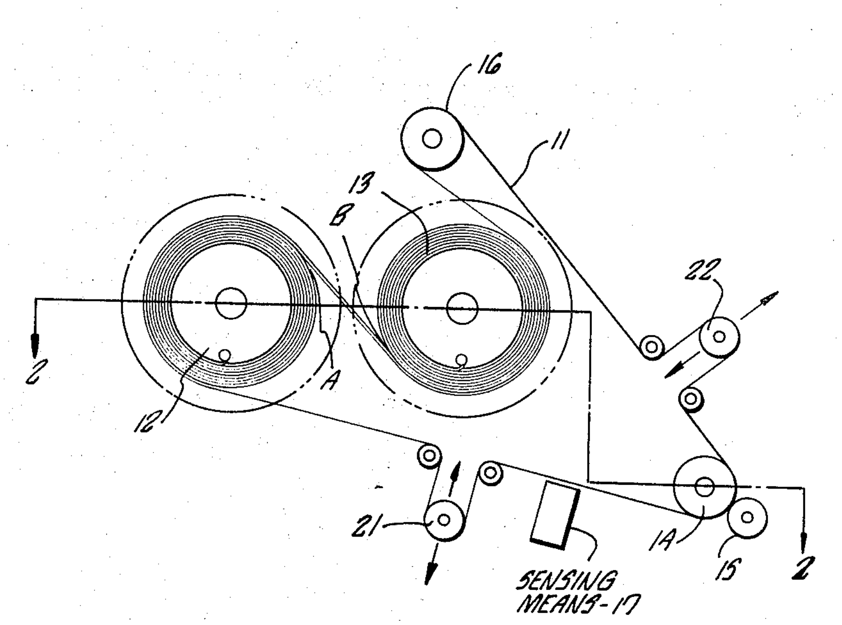
FIG. 1 is a front view of a preferred embodiment of the present invention.
Figure 2:
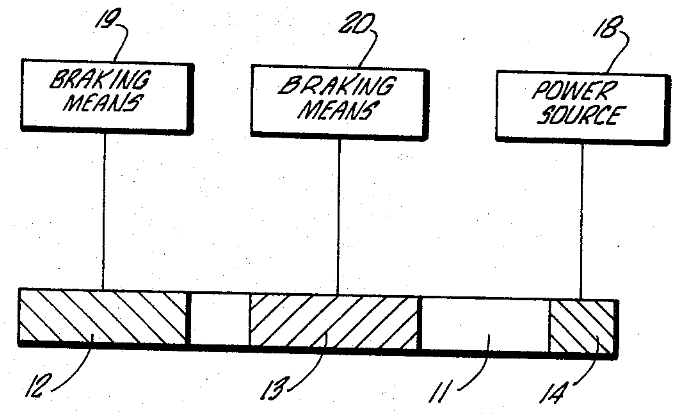
FIG. 2 is a sectional view of the apparatus shown in FIG. 1 taken along line 2—2.

FIGS. 1 and 2 depict a schematic representation of a preferred embodiment of the present invention. A spool of tape 11 is wound between reels 12 and 13. Capstan roller 14 and its associated pinch roller 15 impart bidirectional longitudinal movement to the tape 11 in a conventional manner. An idler wheel 16 is used in a conventional manner to guide tape 11 between reel 13 and the capstan 14.

The novel manner in which the tape 11 is wound between reels 12 and 13, idler 16, and capstan 14 enables the tape 11 to be transferred bidirectionally between reels 12 and 13 by a single application of power. This power is applied to the tape by capstan 14 and pinch roller 15.

A sensing means 17 for sensing information recorded on tape 11 is shown positioned between capstan 14 and reel 12. The sensing means 17 is shown in block diagram form and may represent any well known means capable of sensing information recorded on tape 11. Uniform velocity of tape movement, tape movement in increments of equal lengths or other predetermined modes of tape movement past sensing means 17 may easily be achieved.

Points A and B shown in FIG. 1 indicate those points at which tape 11 winds and unwinds from reels 12 and 13, respectively. If we assume that tape 11 is unwinding from reel 12 and winding upon reel 13, point A indicates that point at which the tape unwinds from reel 12 and point B indicates that point at which the tape winds upon reel 13. The winding arrangement shown in FIG. 1 may most easily be understood by following the route taken by the tape as it unwinds from reel 12 prior to winding upon reel 13. Thus, as the tape unwinds from reel 12 at point A, it belts reel 13 and idler 16, passes between capstan 14 and pinch roller 15, passes sensing means 17, and belts reel 12 before winding upon reel 13 at point B. Thus, it is seen that the tape unwinding from reel 12 forms a loop which excludes reel 13 but includes idler 16, capstan 14 and reel 12 before winding upon reel 13. The tape 11 is caused to unwind from reel 12 and wind upon reel 13, as just described, by the clockwise rotation of capstan 14. Such clockwise rotation of capstan 14 causes a clockwise movement of the tape 11 in the loop just described, and causes a counterclockwise rotation of reel 13 and a clockwise rotation of reel 12. Reel 13 thus becomes the pickup reel and reel 12 the supply reel. Power transferred to the tape by capstan 14 and pinch roller 15 is transferred by the tape to reels 12 and 13. Thus, the tape 11 is itself used as a belt to transmit power to the reels 12 and 13. Consequently, there need be no independent application of power to these reels. Movement of the tape past the sensing means 17 according to a predetermined mode of tape movement is easily achieved by control of the movement imparted to the tape by capstan 14.

Power source 18, shown in FIG. 2 in block diagram form, may represent any well known means for transmitting rotational power of a predetermined character to capstan 14. Thus, for example, if a tape is to be driven at uniform velocity past sensing means 17, power source 18 merely drives capstan 14 at a constant velocity. Similarly, if the tape is to be driven past sensing means 17 in increments of equal length, power source 18 merely drives capstan 14 in equal rotation increments.

The tape may also be caused to unwind from reel 13 and wind upon reel 12 simply by driving capstan 14 in a counterclockwise direction. This will cause reel 12 to be driven in a counterclockwise direction while reel 13 will be driven in a clockwise direction. Reel 12 thus becomes the pickup reel and reel 13 the supply reel. Tape unwinding from reel 13 at point B belts reels 12, passes sensing means 17, passes between capstan 14 and pinch roller 15, belts idler 16, and belts reel 13 before winding upon reel 12 at point A. The counterclockwise movement of capstan 14 transmits power to the tape 11 which in turn is transmitted to reel 12 causing this reel to rotate in a counterclockwise direction and effecting the winding of tape 11 upon this reel.

It may be seen that regardless of the direction of tape movement between the two reels 12 and 13, the tape itself is utilized as a belt to drive these reels at a speed just sufficient to enable the tape to pass sensing means 17 in accordance with a predetermined mode of tape movement as determined by the nature of the drive applied to capstan 14. Since the reels 12 and 13 are driven as a result of the tape 11 being used as a belt, it becomes necessary to maintain sufficient tension within the system. This tension is achieved by applying a braking force to which ever of the two reels 12 and 13 is being utilized as the supply reel. Braking means 19 and 20 are shown in FIG. 2 in block diagram form and may represent any well known means for applying a braking force to a rotatable member when that member rotates in a particular direction. Thus, for example, such braking means may be a unidirectional clutch and brake which is on at all times but applies a braking force in only one direction while allowing the reels 12 and 13 to rotate freely in the other direction. It applies only a slight drag sufficient to maintain tension within the system and thereby permits use of the tape as a belt to drive the reels. Since reel 12 is utilized as the supply reel when it rotates in a clockwise direction, as shown in FIG. 1, braking means 19 will allow reel 12 to rotate freely in a counterclockwise direction but will apply a slight drag when reel 12 is being driven in a clockwise direction. Similarly, braking means 20 will allow reel 13 to rotate freely in a counterclockwise direction but will apply a slight drag when reel 13 is driven in a clockwise direction.

The tape loop shown in FIG. 1 is shown as a relatively short loop. However, the present invention may easily be utilized in situations calling for a longer tape loop simply by the addition of one or more additional idler wheels. Such idler wheels could be utilized to guide the tape in a larger path past one or more additional operating stations prior to its winding upon the pickup reel.

The performance of the present invention may also be enhanced by the addition of buffer units such as the units 21 and 22 shown in FIG. 1. These units enable the apparatus to operate at high speeds. Without such buffer units any impulsive forces applied to the tape 11 by acceleration of capstan 14 may be insufficient to overcome the inertia of the system and cause the tape to break rather than to commence driving of the pickup reel. The speed limitation of a particular system in which buffer units are not used would depend upon the inertia within that particular system. The use of such buffers increases the speed capability of the system and the ability of the system to withstand fast starts and stops. Such buffers have been used in other systems and may include a loaded roller which may, for example, be spring or vacuum loaded. Thus, if capstan 14 accelerates rapidly in a clockwise direction, the loaded roller of buffer 22 would be driven inwardly, as shown in FIG. 1, and would cause the sudden force transmitted to reel 13 to be diminished. Thus, the use of such buffers enables you to accelerate the tape rapidly while still providing time in which to start the pickup reel.

What is claimed is:

1. A transport apparatus, comprising:
a first rotatable hub;
a second rotatable hub;
a single strip of flexible material wound upon both the first and second hubs;
the flexible material unwinding from the first hub and belting the second hub before winding upon the second hub; and
a power transmitting means in operational contact with the flexible material;
the power transmitting means imparting a predetermined longitudinal movement directly to the flexible material;
the portion of the material belted around the second hub imparting rotational movement to the hub causing the material to wind upon the second hub.

2. A transport apparatus comprising:
a first rotatable reel;
a second rotatable reel;
a spool of tape wound between the first and second reels;
the tape unwinding from the first reel, belting the second reel, forming a loop exterior to both reels, and winding upon the second reel; and
a power transmitting means positioned in operational contact with the portion of the tape in the exterior loop;
the power transmitting means selectively imparting a predetermined longitudinal movement to the tape such that the portion of the tape in the exterior loop moves away from the second reel;
the portion of the tape belted around the second reel imparting rotational movement to the second reel such that the tape is caused to wind upon the second reel.

3. A transport apparatus according to claim 2, further comprising:
means for applying a braking force to the first reel.

4. A transport apparatus according to claim 3, further comprising:
an operating station positioned in operational contact with the portion of the tape in the exterior loop.

5. A transport apparatus according to claim 4 in which the operating station comprises sensing means for sensing information recorded on the tape.

6. A transport apparatus according to claim 5, further comprising buffering means for reducing impulsive forces transmitted to the second reel in response to tape acceleration caused by the power transmitting means.

7. A transport apparatus according to claim 5 in which the power transmitting means causes the tape to move at constant velocity past the sensing means.

8. A tape transport assembly comprising:
a first rotatable reel;
a second rotatable reel;
a spool of tape wound between the first and second reels;
the tape unwinding from one of the reels and forming a loop which belts both reels before winding on the other reel; and
a power transmitting means positioned in operational contact with the loop portion of the tape for imparting bidirectional longitudinal movement of a predetermined character to the tape;
in response to movement of the tape in one direction, the portion of tape belted around the first reel imparting rotational movement to the first reel such that the tape is caused to wind upon the first reel;
in response to movement of the tape in the opposite direction, the portion of tape belted around the second reel imparting rotational movement to the second reel such that the tape is caused to wind upon the second reel.

9. A tape transport assembly according to claim 8, further comprising:
means for appling a braking force to whichever one of the two rotatable reels is serving as the supply reel.

10. A tape transport assembly according to claim 9 in which the loop portion of the tape includes one of the two rotatable reels and excludes the other rotatable reel.

11. A tape transport assembly according to claim 10, further comprising:
an operating station positioned in operational contact with the loop portion of the tape.

12. A tape transport assembly according to claim 11 in which the operating station comprises sensing means for sensing information recorded on the tape.

13. A tape transport assembly according to claim 12, further comprising a first buffering means for reducing impulsive forces transmitted to the first reel in response to tape acceleration caused by the power transmitting means.

14. A tape transport assembly according to claim 13, further comprising a second buffering means for reducing impulsive forces transmitted to the second reel in response to tape acceleration caused by the power transmitting means.

15. A tape transport assembly according to claim 11 in which the power transmitting means causes the tape to move in increments of uniform length past the operating station.

16. A transport apparatus, comprising:
a first rotatable hub;
a second rotatable hub;
a single strip of flexible material wound between the first and second hubs;
the flexible material unwinding from one of the hubs and forming a loop which belts both of the hubs before winding upon the other hub; and
a power transmitting means positioned in operational contact with the loop portion of the flexible material for imparting bidirectional longitudinal movement of a predtermined character to the flexible material;
in response to movement of the flexible material in one direction, the portion of material belted around the first hub imparting rotational movement to the first hub such that the tape is caused to wind upon the first hub;

in response to movement of the flexible material in the opposite direction, the portion of material belted around the second hub imparting rotational movement to the second hub such that the material is caused to wind upon the second hub.

17. A transport apparatus according to claim 16 further comprising:

means for operating upon the flexible material positioned in operational contact with the loop portion of the material.

18. A transport apparatus according to claim 17 in which the power transmitting means causes the material to move in increments of uniform length past the operating means.

19. A transport apparatus according to claim 16 in which the power transmitting means causes the material to move at a uniform velocity past the operating means.

References Cited

UNITED STATES PATENTS

| | | | |
|---|---|---|---|
| 1,801,384 | 4/1931 | Youkers | 40—86 |
| 3,114,512 | 12/1963 | Peshel et al. | 242—55.14 |

LEONARD D. CHRISTIAN, *Primary Examiner.*